US007158259B2

(12) United States Patent
Sugiyama et al.

(10) Patent No.: US 7,158,259 B2
(45) Date of Patent: Jan. 2, 2007

(54) PRINTING APPARATUS AND METHOD WITH A QUIET MODE

(75) Inventors: Noriyuki Sugiyama, Kanagawa (JP); Yuji Nakano, Kanagawa (JP); Koichiro Kawaguchi, Kanagawa (JP); Hiroyuki Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 10/936,794

(22) Filed: Sep. 9, 2004

(65) Prior Publication Data

US 2005/0030325 A1 Feb. 10, 2005

Related U.S. Application Data

(62) Division of application No. 10/251,840, filed on Sep. 23, 2002, now Pat. No. 6,824,234.

(30) Foreign Application Priority Data

Oct. 1, 2001 (JP) ............................ 2001-305801

(51) Int. Cl.
*G06F 15/00* (2006.01)
*G06K 1/00* (2006.01)
*G06K 15/10* (2006.01)

(52) U.S. Cl. ......................... 358/1.8; 347/104; 347/12; 347/5; 318/696; 358/1.5

(58) Field of Classification Search ................. 358/1.8, 358/1.5; 347/5, 16, 37
See application file for complete search history.

(56) References Cited

U.S. PATENT DOCUMENTS

| | | | | |
|---|---|---|---|---|
| 5,907,331 | A | 5/1999 | Markham | 347/12 |
| 5,998,956 | A | 12/1999 | Saito | 318/696 |
| 6,065,830 | A * | 5/2000 | Hiramatsu et al. | 347/104 |
| 6,824,234 | B1 * | 11/2004 | Sugiyama et al. | 347/5 |
| 2002/0015163 | A1 | 2/2002 | Singer et al. | 358/1.5 |

FOREIGN PATENT DOCUMENTS

| | | |
|---|---|---|
| JP | 62-251145 | 10/1987 |
| JP | 6-106719 | 4/1994 |
| JP | 6-127049 | 5/1994 |
| JP | 10-264481 | 10/1998 |
| JP | 2000-151906 | 5/2000 |

* cited by examiner

*Primary Examiner*—Twyler Lamb
*Assistant Examiner*—Yixing Qin
(74) *Attorney, Agent, or Firm*—Fitzpatrick, Cella, Harper & Scinto

(57) ABSTRACT

A printing apparatus drive control method is provided which allows the user to select a drive mode in which a printing apparatus can be operated with reduced operation noise whatever print mode is set, such as a fine print mode or a fast print mode, thus eliminating a problem of emitting noisy operation sound to surroundings late at night when a level of noise is comparatively low. One or more of a plurality of motors, which cause a plurality of driven portions in the printing apparatus, such as paper supply unit, main scan unit and paper feed unit, to perform predetermined operations, can be driven in a normal drive mode or a silent drive mode selectively.

14 Claims, 10 Drawing Sheets

| FEED MOTOR DRIVE TABLE | |
|---|---|
| DRIVE DATA | FEED SPEED(inch/sec) |
| L0 | 0.93 |
| L1 | 1.64 |
| L2 | 1.67 |
| L3 | 1.80 |
| L4 | 2.22 |
| L5 | 3.16 |
| L6 | 3.56 |
| L7 | 4.00 |
| L8 | 5.00 |

FIG.7

| SUPPLY MOTOR DRIVE TABLE | |
|---|---|
| DRIVE DATA | SUPPLY SPEED (inch/sec) |
| A0 | 1.89 |
| A1 | 2.51 |
| A2 | 4.00 |
| A3 | 6.00 |
| A4 | 10.00 |

FIG.8

| DRIVE MODE | | NORMAL MODE | | | | | SILENT MODE | | | | |
|---|---|---|---|---|---|---|---|---|---|---|---|
| PRINT MODE | | Fine1 | Fine2 | Fine3 | HQ | HS | Fine1 | Fine2 | Fine3 | HQ | HS |
| SUPPLY MOTOR DRIVE TABLE USED DURING PAPER SUPPLY | | A2 | | A3 | | A4 | A1 | | | | |
| SUPPLY MOTOR DRIVE TABLE USED WHEN FEED MOTOR IS SIMULTANEOUSLY DRIVEN | | A0 | | A1 | | | A0 | | | | |
| FEED MOTOR DRIVE TABLE USED WHEN SUPPLY MOTOR IS SIMULTANEOUSLY DRIVEN | | L1 | | L4 | | | L1 | | | | |
| FEED MOTOR DRIVE RANGES | WHEN FED BY 1-11, 13-23, 25-47 STEPS | L0 | | | | | L0 | | | | |
| | WHEN FED BY 12 STEPS | L1 | | | | | L1 | | | | |
| | WHEN FED BY 24 STEPS | L2 | | | | | L2 | | | | |
| | WHEN FED BY 48-95 STEPS | L3 | | L4 | | L5 | L1 | | | | |
| | WHEN FED BY 96-191 STEPS | L4 | | L5 | | L7 | L1 | | | | |
| | WHEN FED BY 192 STEPS | L4 | | L6 | | L8 | L3 | | | | |
| | WHEN DISCHARGING | L4 | | L6 | | L8 | L3 | | | | |

FIG.9

PRINTING APPARATUS AND METHOD WITH A QUIET MODE

This application is a division of application Ser. No. 10/251,840 filed Sep. 23, 2002 now U.S. Pat. No. 6,824,234.

This application is based on Patent Application No. 2001-305801 filed Oct. 1, 2001 in Japan, the content of which is incorporated hereinto by reference.

BACKGROUND OF THE INVENTION

1. Field of the Invention

The present invention relates to a printing apparatus used as an image output terminal for computers and also to a printing apparatus used as a recording unit for copying machines, word processors and facsimiles. More specifically, the present invention relates to a printing apparatus having a variety of drive sources to perform various drive operations, a printing apparatus drive control method, a printing system having the printing apparatus, and a program for executing the drive control method.

2. Description of the Related Art

Printing apparatuses are known to have a plurality of selectable print modes such as high resolution print mode and fast print mode according to a user demand. Such conventional printing apparatus adopts a construction in which a control of various drive sources for performing main and sub scans is made variable to match a selected print mode.

In recent years the size and weight and the cost of the printing apparatus have drastically decreased. The printing apparatus are now being used widely in offices and homes and even have found personal uses. With the use of the printing apparatus ever spreading, environments in which the printing apparatus are used are becoming more and more versatile. Under these circumstances, there are growing needs to consider the environments under which the printing apparatus are used.

For example, operation noise of the printing apparatus, as produced by supplying and feeding of a print medium, scanning of a print head and a printing operation, though it may not feel noisy during the day, may become a nuisance at night when surroundings are quiet. The time when the operation noise becomes a problem is not limited to the night-time. For example, in such environments as libraries and schools, a quietness is given a special importance and therefore the operation noise of the printing apparatus is better avoided.

The magnitude of operation noise of the printing apparatus is related to a printing speed and thus reducing the printing speed can lower the operation noise. In the printing apparatus described above, because a fine print mode is accompanied by a reduction in the printing speed, selecting this mode can perform a comparatively quiet printing.

However, the fine print mode consumes a relatively large volume of print liquid (i.e., ink in the case of an ink jet printer). It may therefore happen that an unintended increase in the print liquid consumption results when the user does not originally want such a fine print. To minimize the consumption of the print liquid, therefore, the user has no other alternative but to select a fast print mode which produces relatively large operation noise.

That is, the conventional printing apparatus place importance on the selection of print modes and it is difficult to use the printing apparatus according to both the user demand and the environment in which it is being used.

The present invention has been accomplished with a view to overcoming the problem described above. It is therefore an object of the present invention to provide a printing apparatus that allows the user to perform printing without worrying the operation noise emitted to the surroundings whichever print mode the user selects.

SUMMARY OF THE INVENTION

To solve the problem described above, the present invention in one aspect provides a printing apparatus using a print head for ejecting a print liquid onto a print medium to form an image on the print medium, the printing apparatus comprising: a drive control means to drive one or more of a plurality of drive sources in a first drive mode or a second drive mode selectively, wherein the plurality of drive sources are adapted to cause a plurality of driven portions in the printing apparatus to perform predetermined operations and the second drive mode makes a driving of the drive sources quieter than in the first mode; and a mode switching means to switch between the first drive mode and the second drive mode.

In another aspect, the present invention provides a method of controlling a printing apparatus, wherein the printing apparatus uses a print head for ejecting a print liquid onto a print medium to form an image on the print medium, the method comprising: a drive control step of driving one or more of a plurality of drive sources in a first drive mode or a second drive mode, wherein the plurality of drive sources are adapted to cause a plurality of driven portions in the printing apparatus to perform predetermined operations and the second drive mode makes a driving of the drive sources quieter than in the first mode; and a mode switching step of switching between the first drive mode and the second drive mode.

In still another aspect, the present invention provides a printing system comprising: a printing apparatus using a print head for ejecting a print liquid onto a print medium to form an image on the print medium; and an image supply device for supplying image data to the printing apparatus so that the printing apparatus can perform printing according to the image data supplied; wherein the printing apparatus includes: a drive control means to drive one or more of a plurality of drive sources in a first drive mode or a second drive mode, wherein the plurality of drive sources are adapted to cause a plurality of driven portions in the printing apparatus to perform predetermined operations and the second drive mode makes a driving of the drive sources quieter than in the first mode; and a mode switching means to switch between the first drive mode and the second drive mode.

In the above, the plurality of driven portions may include, for the purpose of performing the printing, a supplying means for introducing the print medium into the printing apparatus and a scanning means for scanning the print head relative to the print medium, and the supplying means and the scanning means may be each provided with one of the drive sources.

The scanning means may have, for the purpose of performing the printing, a means for main-scanning the print head relative to the print medium and a means for sub-scanning the print medium after each main scan, and the main-scanning means and the sub-scanning means may be each provided with one of the drive sources.

In the above, the plurality of the driven portions may further include a performance maintaining means for maintaining a performance of the print head of applying the print liquid and the performance maintaining means may be provided with one of the drive sources.

Further, when performing the driving in the first drive mode, the drive control means or the drive control step may use a plurality of drive control data associated with a series of drive controls.

When performing the driving in the second drive mode, the drive control means or the drive control step may select, from the plurality of drive control data used in the first drive mode, drive control data that achieves a quiet driving and set the selected drive control data.

Further, the drive control means or the drive control step may perform the selection and setting so that drive speeds of the drive sources at each stage of a series of drive controls in the second drive mode are equal to or less than drive speeds of the drive sources at each stage of a series of drive controls in the first drive mode.

In the above, a plurality of preset print modes may be provided according to a plurality of ways in which the printing using the print head is performed, and the plurality of print modes may be each provided with the first drive mode.

Further, the driving of the drive sources in the second drive mode may not be varied among the plurality of different print modes.

Further, in the above, the print head may be an ink jet print head that ejects ink as the print liquid, and the ink jet print head may have heating elements that generate a thermal energy to eject ink by causing a film boiling in the ink.

Furthermore, the present invention includes a control program for instructing a computer to execute any form of the printing apparatus control method described above and a storage medium storing the control program.

With this invention it is possible to perform printing without the user worrying about the operation noise of the printing apparatus emitted to the surroundings whatever print mode is selected.

In this specification, the word "print" (or "record") means not only forming significant information, such as characters and figures, but also forming images, patterns and figures on a print medium or processing a print medium.

The "print medium" includes not only paper used in common printing apparatus but also a wide range of materials that can accommodate ink, such as cloth, plastic films, metal plates, glass, ceramics, wood materials and leather. The print medium may also be referred to as "print paper" or simply "paper" in the following description.

Further, the word "ink" (or "liquid") should be interpreted in a wide sense as with the definition of the "print" and refers to a liquid applied to a print medium to form images, patterns and figures on the print medium, to process the print medium or to process the ink (e.g., solidification or insolubilizing of colorants in the ink applied to the print medium).

The above and other objects, effects, features and advantages of the present invention will become more apparent from the following description of embodiments thereof taken in conjunction with the accompanying drawings.

BRIEF DESCRIPTION OF THE DRAWINGS

FIG. 7 is an example of a feed motor drive table in one embodiment of the invention;

FIG. 8 is an example of a supply motor drive table in one embodiment of the invention; and FIG. 9 is an example of a drive value index table for the feed motor and the supply motor according to one embodiment of the invention, with the drive value being selected according to a set drive mode and a set print mode.

DETAILED DESCRIPTION OF PREFERRED EMBODIMENT

The present invention will be described in detail by referring to the accompanying drawings.

There is a growing demand on the printing apparatus of recent years for higher printing speed. To meet this demand, not only electric processing such as data processing but mechanical drive processing itself have come to be performed at higher speeds. As the speed of the mechanical drive processing, including the supplying and feeding of a print medium, the scanning of a print head and the printing operation, increases, the operation noise tends to increase accordingly. Therefore, as described above, when a printing apparatus is operated in home late at night, the user needs to take care that the operation noise will not be a nuisance to family members already in bed. Under some circumstances as when the printing apparatus is used late at night, quietness is given a particular importance. In this embodiment, a printing apparatus used has a mode that performs printing quietly (hereinafter referred to as a silent mode).

(1) Example Configuration of Printing System

Figure 1:
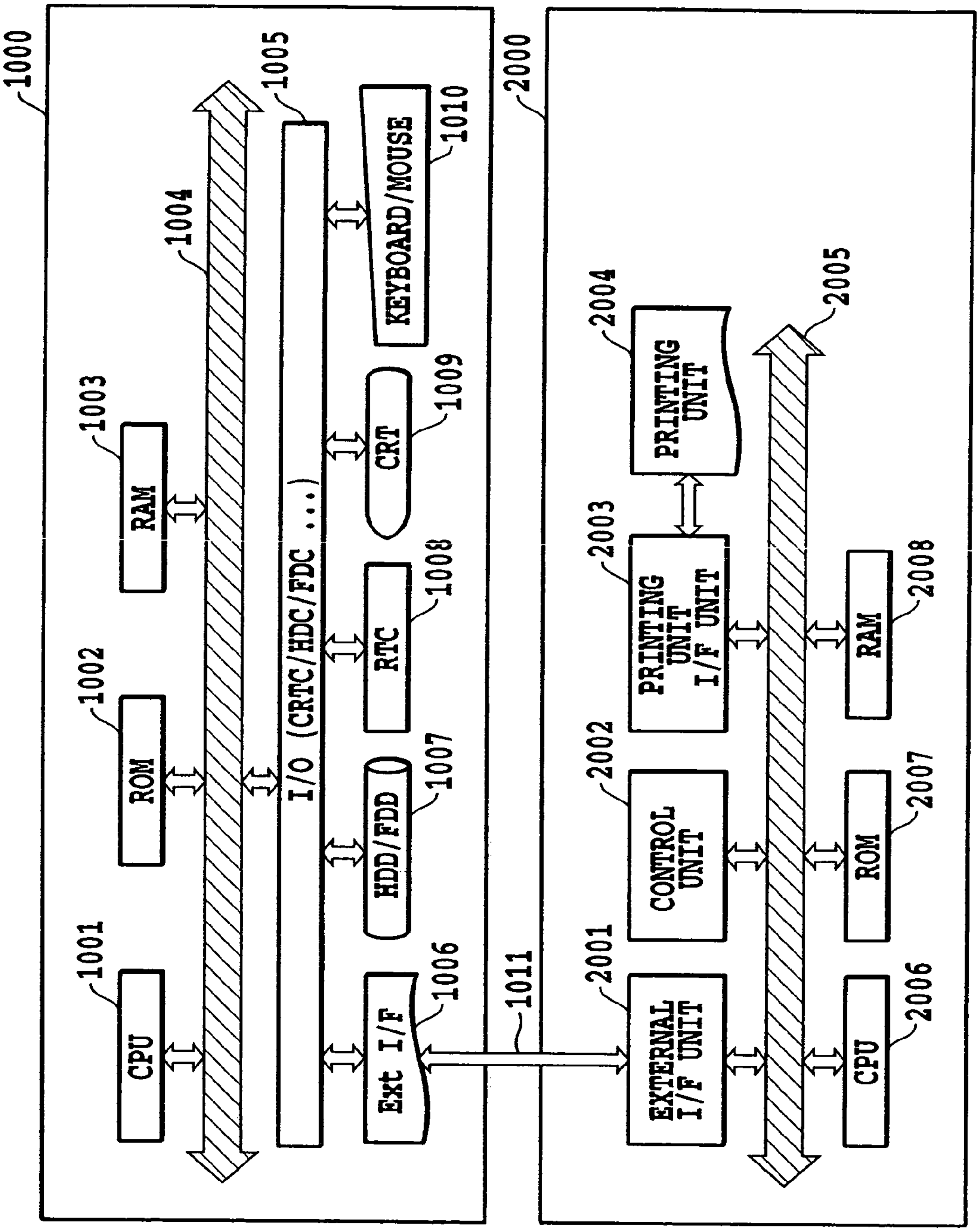
FIG. 1 is a block diagram showing an example configuration of a printing system using a printer according to one embodiment of the present invention.

FIG. 1 is a block diagram showing an example configuration of a printing system having a printer according to one embodiment of this invention.

The system of this embodiment largely comprises a host computer 1000, which generates print data (including a control command; the same applies to the following description) and sets a UI (user interface) for the print data generation, and a printer 2000 that forms an image on a print medium according to the print data.

The host computer 1000 includes a CPU 1001, a ROM 1002, a RAM 1003, a system bus 1004, an I/O controller (CRTC, HDC, FDC, etc.) 1005 for a variety of input/output devices, an external interface (I/F) 1006, an external storage device (HDD/FDD) 1007 such as a hard disk drive (HDD) and a floppy (registered trademark) disk drive (FDD), a real time clock (RTC) 1008, a CRT 1009, and an input device (keyboard and mouse) 1010.

The CPU 1001 operates according to an application program, a communication program, a printer driver and an operating system (OS) read into the RAM 1003 from the external storage device 1007 and so on. When power is turned on, the computer is booted from the ROM 1002 to load the OS from the external storage device 1007 etc. into the RAM 1003, followed by the similar loading of an application program and a driver software, etc. Now, the computer can function as a system. The external I/F 1006 successively sends print data 1011 spooled in the RAM 1003 and the external storage device 1007 (HDD) to the printer 2000. The input device 1010 inputs data specified by the user into the host computer through the I/O controller 1005. The RTC 1008 clocks the system time and performs retrieving and setting of time information through the I/O controller 1005. The CRT 1009 is a display which is controlled by the CRTC in the I/O controller 1005. A block of the CRT 1009 and the input device 1010 makes up a user interface.

The printer 2000 includes an external I/F unit 2001, a control unit 2002, a printing unit I/F unit 2003, a printing unit 2004, a CPU 2006, a ROM 2007, a RAM 2008, and a system bus 2005.

That is, the printer 2000 comprises: the external I/F unit 2001 for receiving control commands and print data 1011 from the host computer 1000 and informing various status information to the host computer 1000; the control unit 2002 for interpreting the received print data and generating data to be printed by the printing unit 2004; the printing unit 2004 as a printer engine for receiving data output from the printing unit I/F unit 2003 and actually forming an image; the CPU 2006 for controlling the entire printer; the ROM 2007 for storing a control program for the printer; and the RAM 2008 as a work area, such as a data receiving buffer, used by the external I/F unit 2001.

The printer 2000 may include a laser printer, a heat transfer or heat sensitive type printer, a dot impact printer and an ink jet printer. In this example, an ink jet printer which has an ink jet head in the printing unit 2004 is used. The ink jet head currently available uses a thermal energy or a mechanical energy for ejecting ink. In this example, the ink jet head employs electrothermal transducers that, when energized, generate a thermal energy which in turn causes film boiling in ink.

(2) Example Configuration of Printer

Figure 2:
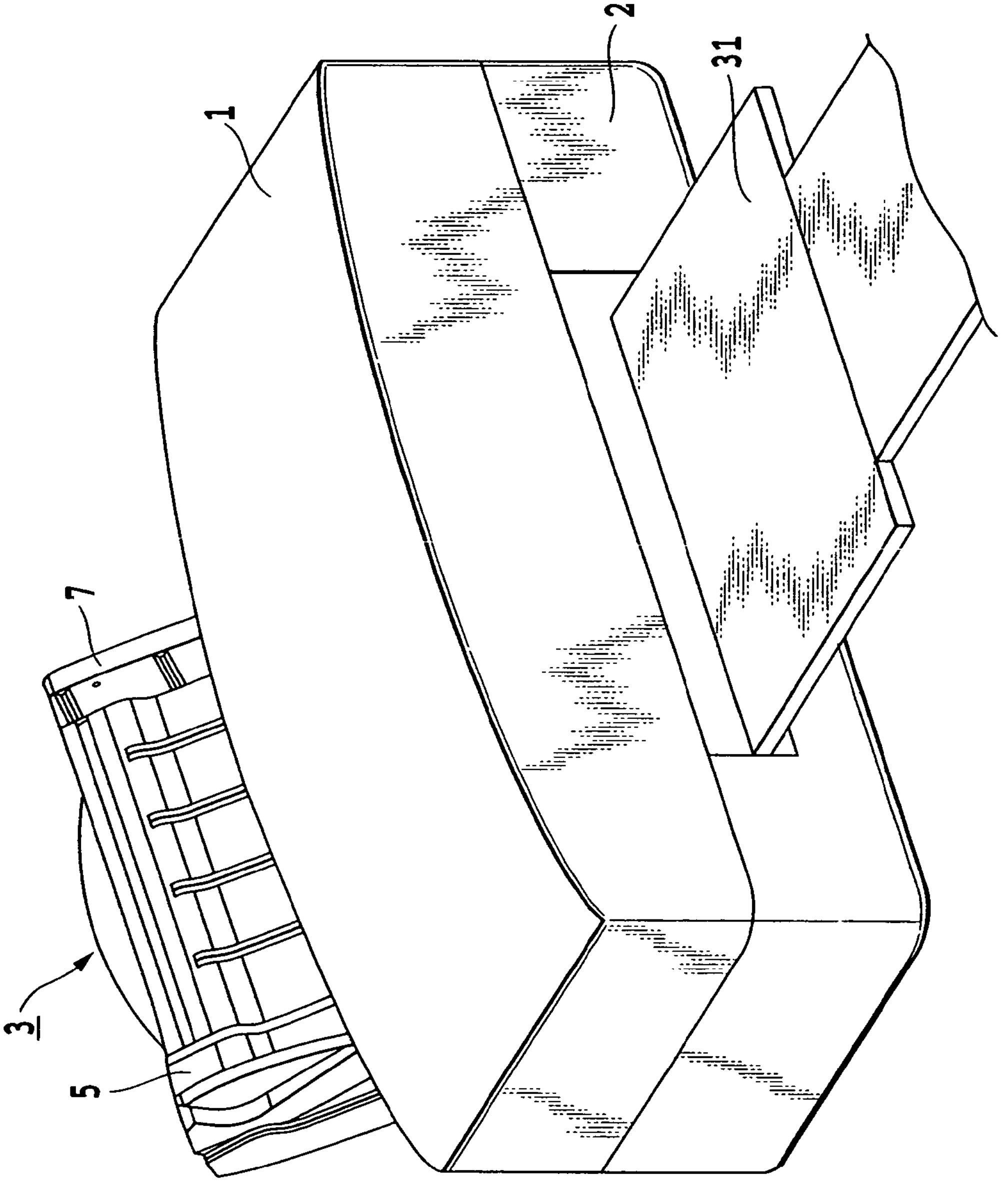
FIG. 2 is a perspective view showing an external construction of an ink jet printing apparatus of serial scan type, an example printer according to one embodiment of the present invention.
Figure 3:
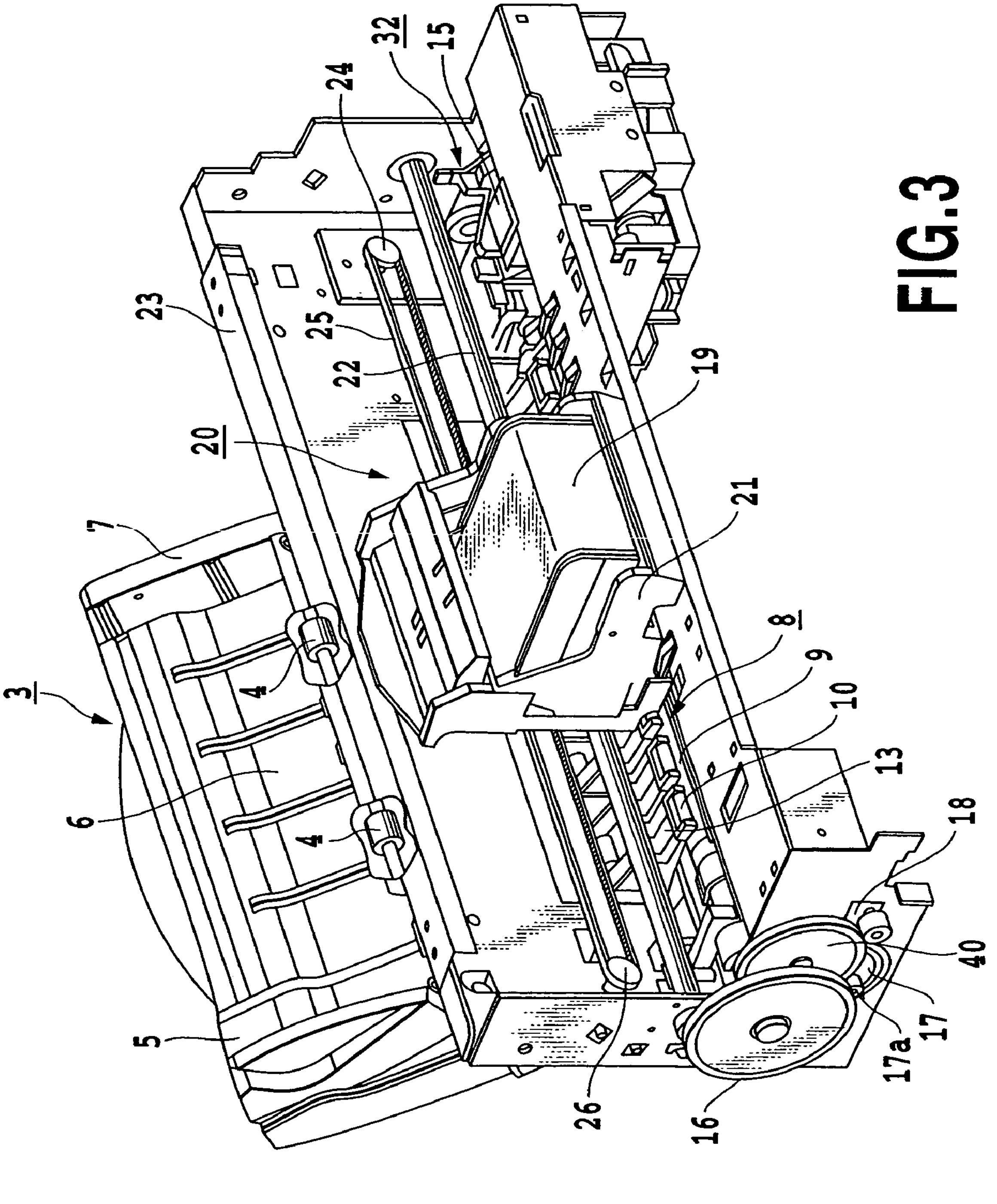
FIG. 3 is a perspective view showing an example of an internal construction of the printer of FIG. 2.
Figure 4:
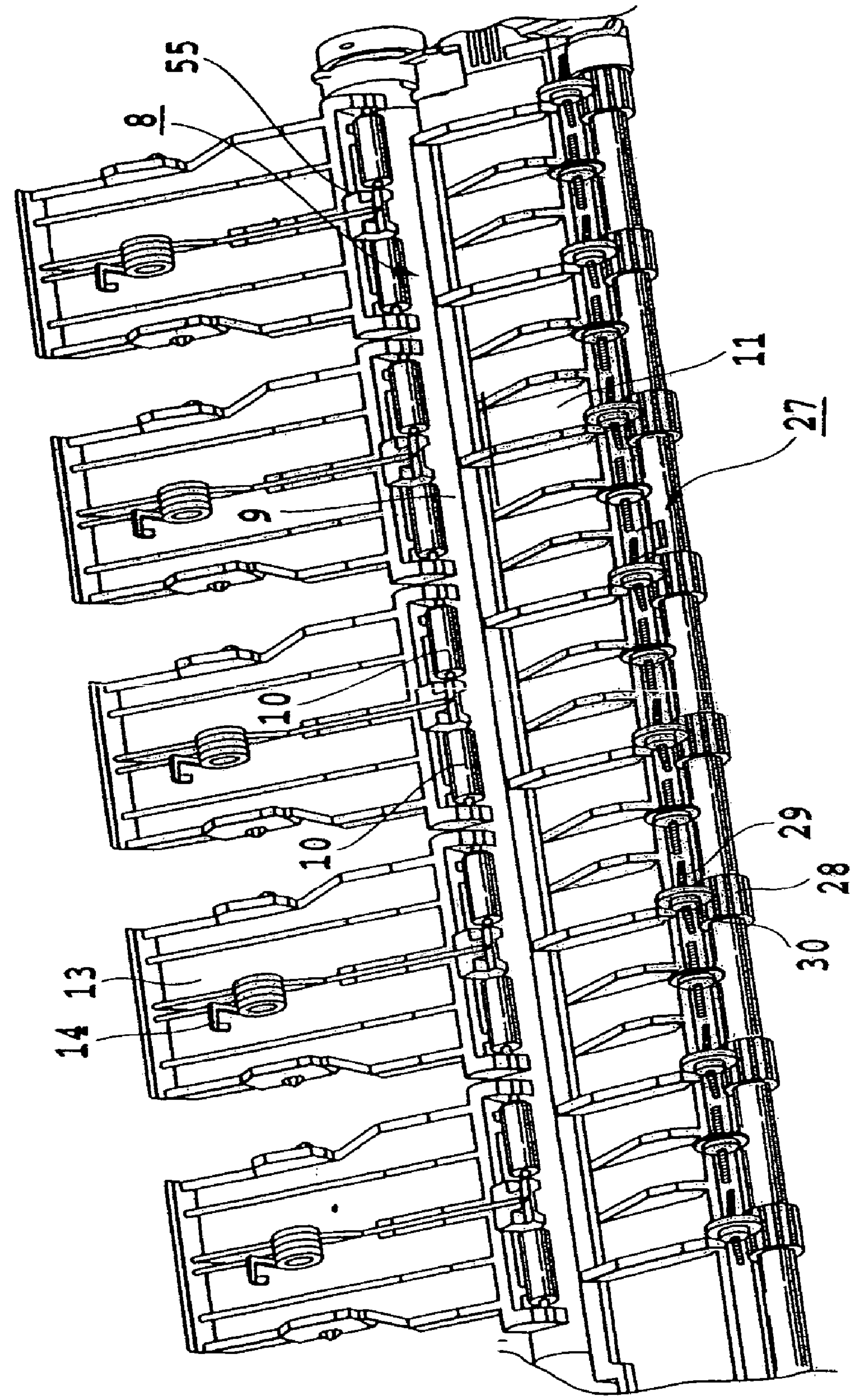
FIG. 4 is a perspective view showing an example construction of an essential part of a printing unit and its associated components in the printer of FIG. 3.

FIG. 2 to FIG. 4 illustrate an example of mechanical construction of the printer 2000 of this embodiment. Here, a serial scan type ink jet printing apparatus is shown. FIG. 2 is a perspective view showing an external construction of the apparatus, FIG. 3 a perspective view showing its internal construction and FIG. 4 a perspective view showing a construction of an essential part of the printing unit and its associated components.

The printer 2000 of the ink jet printing type in this embodiment includes a supply unit, a feed unit, a printing unit and a discharge unit. All these units are installed in an upper case 1 and a lower case 2. These will be detailed in the following.

The paper supply unit 3, as shown in FIG. 2, is attached to an apparatus body at an angle of 30 to 60 degrees from a horizontal plane. Stacked print mediums that are set on the paper supply unit 3 are discharged almost horizontally after being printed. At a lower part of the paper supply unit 3 is provided a supply port not shown through which the print medium is fed almost horizontally. The paper supply unit 3 has supply rollers 4 that are rotated by a supply motor not shown, a movable side guide 5, a pressure plate 6, a base 7, and a separation claw not shown. The print mediums stacked on the pressure plate 6 are fed one at a time to a feed unit 8 by the separation claw and the supply rollers 4.

The feed unit 8 has a feed roller 9, pinch rollers 10 and a platen 11. The print medium fed to the feed unit 8 is transferred to a nip portion between the feed roller 9 and the pinch rollers 10. The pinch rollers 10 are rotatably supported on a pinch roller shaft 55 and in this condition mounted to a pinch roller holder 13. The pinch rollers 10 are urged by a pinch roller spring 14 to press against the feed roller 9 and rotate, driven by the rotation of the feed roller 9, to apply a driving force to the print medium.

Then, the driving force of a feed motor 18 is conveyed to the feed roller 9 through an intermediate gear 17 including intermediate driving gear 17*a* and a feed roller gear 16. The print medium held between the feed roller 9 and the pinch rollers 10 is fed a predetermined distance over the platen 11 to a printing start position according to the rotation of the feed roller 9. Then, a print head 19 performs printing based on predetermined image information.

The print head 19 forms an image on the print medium carried by the feed roller 9 and the pinch rollers 10 by applying ink to the print medium. A printing means in this apparatus employs an ink jet printing system that ejects ink from the print head to form an image. This print head has fine liquid ejection ports (orifices), liquid paths communicating with the ejection ports, energy application portions installed in the liquid paths to apply an energy to the liquid for ejection, and an energy generation means for generating the energy.

Among possible energy generation means are one that uses electromechanical transducers such as piezoelectric elements, one that applies electromagnetic waves such as laser to the liquid to heat it and eject liquid droplets by the generated heat, and one that uses electrothermal transducers each having a heating resistor to heat the liquid for ejection. Of the print heads using these energy generation means, a print head in the ink jet printing system that uses a thermal energy for ejecting liquid droplets, in particular, can have densely arrayed liquid ejection ports (orifices) that eject print liquid to form liquid droplets to be applied onto the print medium. Because of this ability, this type of print head can perform printing at high resolution. Further, a print head using the electrothermal transducers as the energy generation means can easily be reduced in size and fully utilize the IC and micromachining technologies in the semiconductor manufacturing field that feature remarkable technical advancements and rapidly improving reliability of recent years. This type of print head therefore can easily be increased in a packaging density at a low manufacturing cost and thus constitutes an advantageous option. Of these print heads, the one that causes film boiling in the ink by the heat generated by the electrothermal transducers and uses energy of bubbles to eject ink from the orifices is advantageous in terms of a stable ejection operation.

The print head 19 may have head units for black, cyan, magenta and yellow inks to print a color image.

A recovery unit 32 has a cap 15 and a pump unit not shown. When the print head 19 moves to a position where an ink ejection port forming surface, not shown, of the print head faces the cap 15, the cap 15 is raised by a recovery motor not shown until it contacts and hermetically covers the ink ejection port forming surface of the print head 19. In this condition, when the pump unit is operated by the recovery motor, ink is drawn out of the ink ejection ports of the print head 19 by suction. This recovers or maintains the ejection performance of the print head 19.

A printing unit 20 includes, as shown in FIG. 3, a carriage 21 for mounting the print head 19, a guide shaft 22 for reciprocally moving the carriage 21 in a main scan direction perpendicular to a sub-scan direction in which the print medium is fed, a guide 23 for supporting the upper part of the carriage 21 and maintaining a distance between the ejection ports of the print head 19 and the print medium, a timing belt 25 for transmitting the driving force of a carriage motor 24 to the carriage 21, an idle pulley 26 for stretching the timing belt 25 between it and a pulley attached to the motor 24, and a flexible printed circuit board not shown for transmitting head drive signals and other signals to the print head 19.

The print head 19 mounted on the carriage 21 ejects ink as it is moved in the main scan direction over the print medium that is standing by at the print start position. This operation prints a strip of an image whose width corresponds to the ejection port array length. After the first main scan, the feed roller 9 is rotated to advance the print medium 2.709 mm at a time, for example. Then, the print head 19 is again main-scanned to print another strip of the image on the print medium held on the platen 11. That is, the main scan of the print head 19 by moving the carriage 21 and the sub-scan of the print medium by advancing it a predetermined distance using the feed unit are alternately repeated until the image is printed over an entire surface of the print medium.

A discharge unit 27, as shown in FIG. 4, includes discharge rollers 28, a discharge roller gear 40 mounted on the discharge rollers 28 to transmit a driving force of the feed motor 18 to the discharge rollers 28 through the intermediate gear 17, spurs 30 cooperating with the discharge rollers 28 and kept in point contact with a print surface of the print medium to apply a driving force to the print medium for discharging, and a discharge tray 31 for facilitating the discharging of the print medium. The spurs 30 are inserted into the holder (not shown) through spring shafts 29 and pressed against the discharge rollers 28 by the urging force of the spring shafts 29. The spurs 30 rotate, driven by the rotation of the discharge rollers 28.

The printer 2000 shown in FIG. 2 to FIG. 4 is one of printing apparatus based on a non-impact printing system and has an excellent advantage of being able to perform a high-density printing operation at high speed with low noise. In recent years, however, there is an increasing demand for higher printing speeds. Although the print head shown can meet such a demand, the increased speed of the main scan (carriage scan) operation and the sub-scan (print medium feeding) operation inevitably increases the operation noise of the printer.

The printer 2000 of this embodiment is capable of printing in a silent mode. That is, whichever print mode is selected, the drive signals for various motors are set to appropriate values under the control of the CPU 2006 so that the scan speed of the carriage and the supply speed and feed speed of the print medium are set slower than those of the normal mode to reduce the operation noise.

(3) Outline of Mode Setting and Printing Operation

In the above construction, when the printer 2000 is connected to the host computer 1000, a communication program for the printer 2000 and a printer driver for generating print data are installed first. Then, to print an image using the printer 2000, it is now common to make predetermined settings using a utility menu of the printer driver on a display.

Figure 5A:
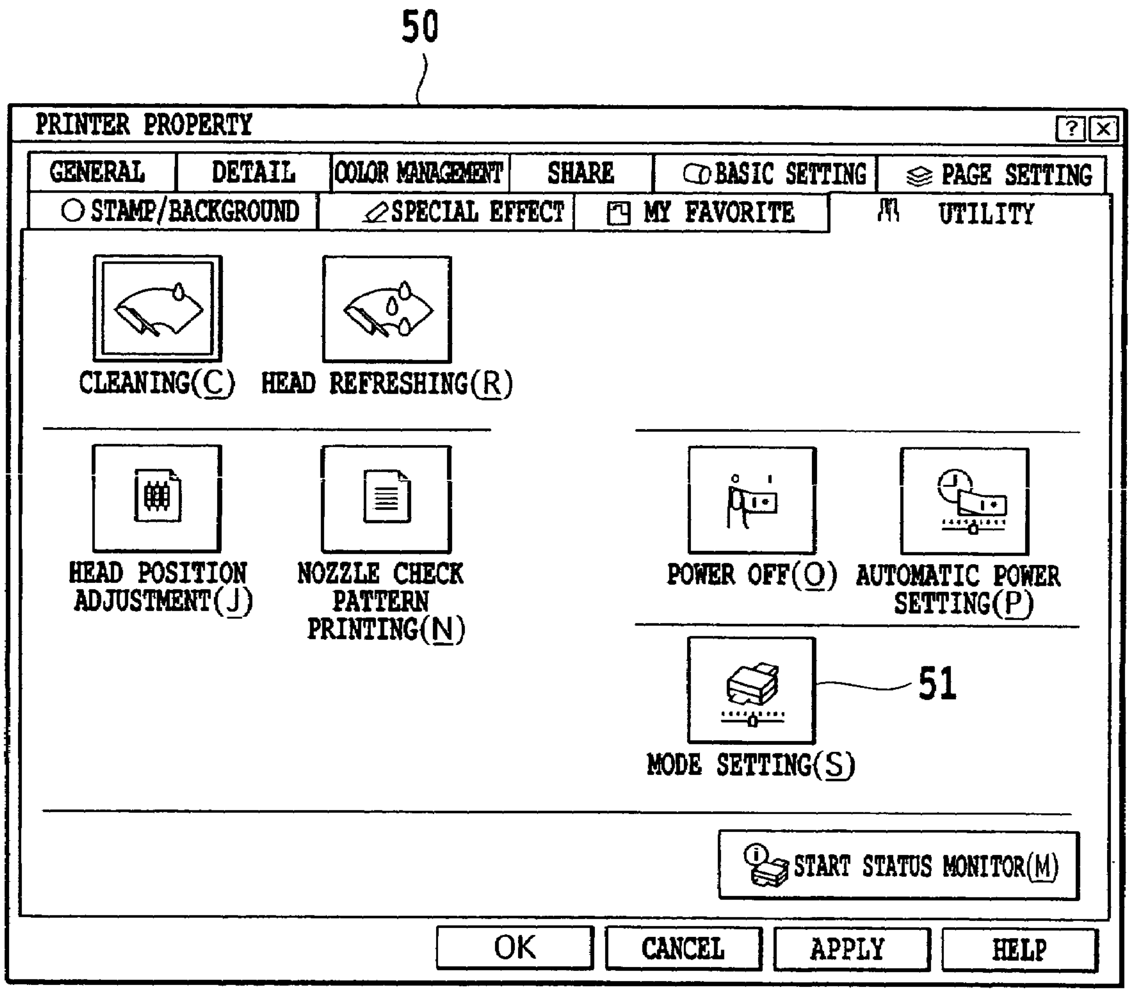
FIG. 5A and FIG. 5B illustrate an example of a utility menu in a printer driver installed in a computer shown in FIG. 1 and an example of a mode setting dialog box, respectively.

FIG. 5A illustrates an example of the utility menu in the printer driver according to one embodiment of the present invention. Denoted 50 is a property screen of the printer driver in which a utility sheet is shown selected from a plurality of property sheets. On this sheet are arranged multiple buttons including one for performing a test print to check the ejection performance of the ink jet head, one for cleaning the print head and one for starting an ejection performance recovery operation. Also provided on this sheet is a mode setting button 51 for initiating a setting operation for a drive mode and a print mode. Clicking on this button 51 with a mouse etc. opens a dialog box for the setting of each mode.

Figure 5B:
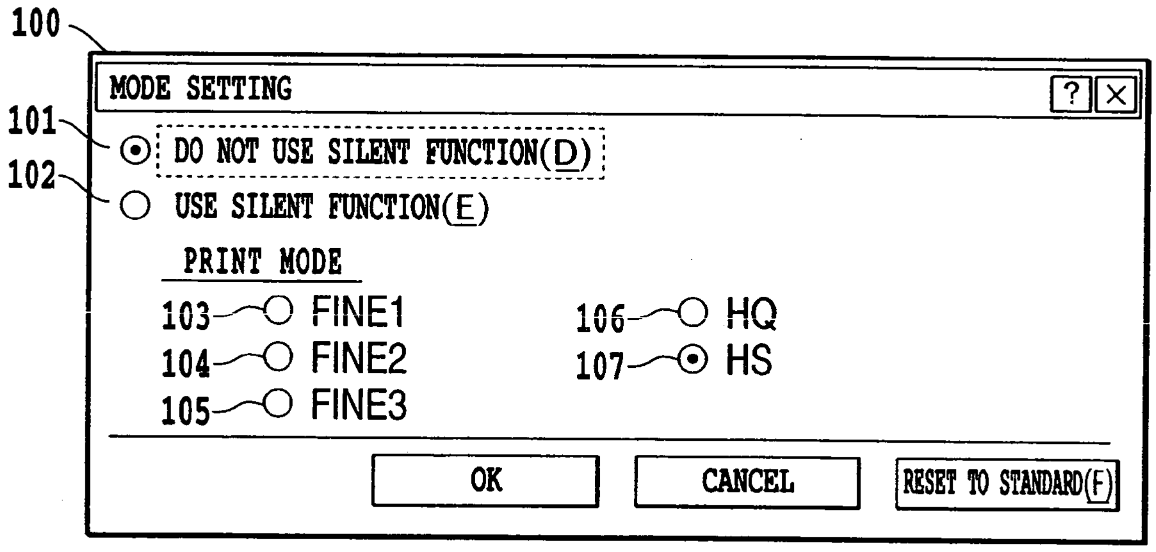

FIG. 5B illustrates an example display of a silent mode setting dialog box 100 in this embodiment. For the drive mode setting in this embodiment there are two options, "Do not use silent function" and "Use silent function." These functions are each assigned with a select button 101 or 102 and are subject to an exclusive control whereby only one of them can be selected. 103–107 are print mode select buttons for five print modes, ranging from a "Finel" mode or fine print mode that performs a highest quality printing to an "HS" mode or high speed mode that performs a fast printing with a reduced ink consumption but with a degraded print quality.

Figure 6:
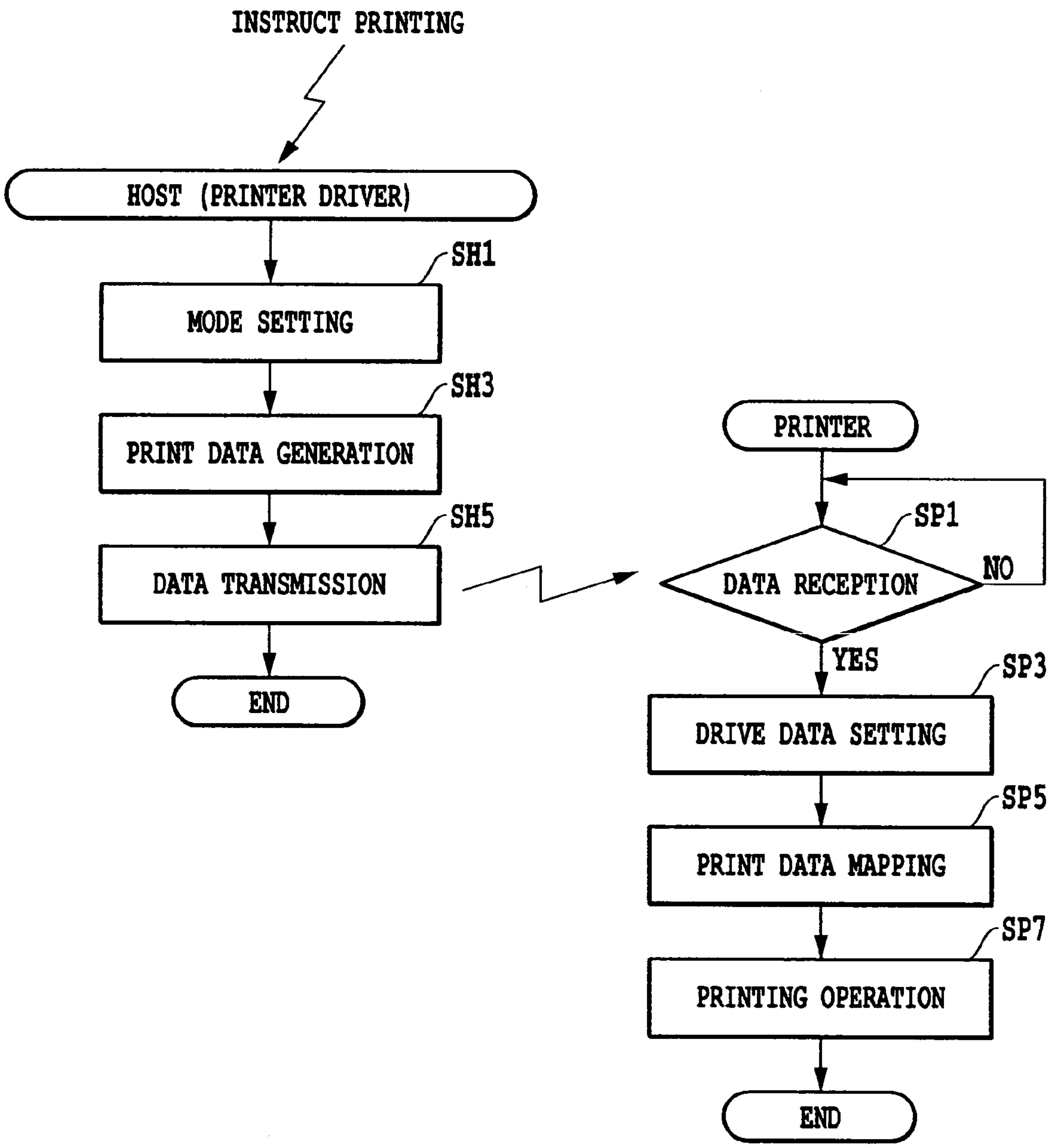
FIG. 6 is a flow chart showing an example sequence of printing operations performed on the part of the printer driver and on the part of the printer in one embodiment of the invention.

FIG. 6 is a flow chart showing an example sequence of steps performed on the part of the printer driver and the printer during the course of a printing operation. Referring to this flow chart, an outline of the processing according to one embodiment of the present invention will be explained.

Upon receiving a print start instruction generated by the application according to a print instruction from the user, the printer driver for generating print data performs the drive mode and print mode setting (step SH1). In this setting operation, when the user manipulates the mode setting button 51 on the utility sheet 50 of FIG. 5A and selects a desired drive mode and print mode in the mode setting dialog box of FIG. 5B, processing is done to set the selected modes. If the selection is not made, the mode last selected by the user or a default mode is set. Next, print data generation processing is done (step SH3) and the generated print data is transferred along with the mode setting data to the printer 2000 (step SH5). The print data generation processing itself is similar to that performed by the conventional printer driver.

The printer 2000 waits to receive data from the printer driver (step SP1). When the data is received, the printer sets drive data according to the selected mode (step SP3), performs print data mapping and conversion (step SP5), and executes the printing operation (step SP7).

(4) Example of Motor Drive Control Based on Mode

Next, referring to FIG. 7 through FIG. 9, the motor drive control performed on the feed motor 18 and the supply motor according to the selected drive mode and print mode will be detailed. Here, stepping motors are used for the feed motor 18 and the supply motor.

FIG. 7 shows an example of a drive value table for the feed motor 18. In the table, values in a column denoted "feed speed" represent speeds at which a print medium is fed (constant speeds) when the feed motor 18 is operated under the predetermined drive conditions corresponding to the "drive data" in the table. In this embodiment, nine kinds of drive data "L0" to "L8" required to feed a print medium are provided in the table. According to a drive condition defined by the selected drive data, the feed motor 18 is controlled.

FIG. 8 shows an example of a drive value table for the supply motor. Values in a column denoted "supply speed" represent speeds at which a print medium is supplied (constant speeds) when the supply motor is operated under the predetermined drive conditions corresponding to the "drive data" in the table. In this embodiment, five kinds of drive data "A0" to "A4" required to supply a print medium are provided in the table. According to a drive condition defined by the selected drive data, the supply motor is controlled.

FIG. 9 shows an example of a drive value index table for the feed motor 18 and supply motor in which an appropriate drive value index is selected according to the selected drive mode and print mode. For each of two drive modes, a normal mode and a silent mode, the silent mode being a drive mode in which the operation noise of the feed motor 18 and the supply motor is quieter than that of the normal mode, this table provides a drive value index corresponding to each print mode "Fine1" to "HS". As described earlier, there are five print modes, ranging from a "Fine1" mode or fine print mode that performs a highest quality printing to an "HS" mode or high speed mode that performs a fast printing with a reduced ink consumption but with a degraded print quality.

Here, with reference to FIG. 9, we will explain about the process of a drive control of the feed motor 18 and the supply motor when the user selects a "normal" drive mode and an "HS" print mode and also the process of a drive control when the user selects a "silent" drive mode and an "HS" print mode.

First, when, with a "normal" drive mode and an "HS" print mode selected, a print instruction is issued, the supply motor is controlled under a drive condition corresponding to the drive data "A4," with the result that the supply rollers supply a sheet of print medium to the feed unit 8 until the front end of the print medium contacts a nip portion between the feed roller 9 and the pinch rollers 10, at which time the driving operation of the supply motor under the drive condition according to the supply motor drive index "A4" is stopped temporarily.

After this, the supply motor again starts to be controlled under a drive condition corresponding to the drive data "A1" and at the same time the feed motor 18 also begins to be controlled under a drive condition corresponding to the drive data "L4." After the supply motor has been driven to a position where the supply rollers 4 started supplying the print medium under the drive condition corresponding to the drive data of "A4", the supply motor is stopped. The feed motor 18, after having fed the print medium to a print start position on the platen 11, is stopped. The print head 19 mounted on the carriage 21 is main-scanned over the print medium held at the print start position to print an image according to predetermined image information. Then, after the print medium is fed a predetermined distance by the rotation of the feed roller 9, the print head 19 is again main-scanned. This process of main scan and print medium feeding is repeated to execute the printing of an image on the print medium.

Then, depending on whether the print medium is fed a predetermined distance or a discharge operation is performed to discharge the print medium whose entire surface has been printed, the drive value index to be selected for driving the feed motor 18 varies. In this embodiment, the feed motor 18 is constructed of a stepping motor. When the feed motor 18 is driven in the "HS" mode, it is set that 192 steps driving of the stepping motor results in the feeding of the print medium by a predetermined distance (10.837 mm). Hence, from FIG. 9, the feed motor 18 is driven under the drive condition corresponding to the drive data "L8" to execute the feeding of the print medium by the predetermined distance. Then, each time the print medium is fed the predetermined distance, the print head 19 prints on the print medium. When this sequence of feeding and printing is ended, the print medium is discharged. In this way, the feed motor 18 is driven under the drive condition corresponding to the drive data "L8" until a series of printing operations is completed.

On other hand, when, with a "silent" drive mode and an "HS" print mode selected, a print instruction is issued, the supply motor is driven under a drive condition corresponding to the drive data "A1," with the result that the supply rollers 4 supply a sheet of print medium to the feed unit 8 until the front end of the print medium contacts the nip portion between the feed roller 9 and the pinch rollers 10, at which time the driving operation of the supply motor under the drive condition according to the supply motor drive index "A1" is stopped temporarily.

After this, the supply motor again starts to be controlled under a drive condition corresponding to the drive data "A0" and at the same time the feed motor 18 also begins to be controlled under a drive condition corresponding to the feed motor drive value index of "L1". The supply motor is stopped after it has been driven to a position where it began to feed the print medium under the drive condition corresponding to the drive data of "A1". The feed motor 18, after having fed the print medium to a print start position on the platen 11, is stopped. The print head 19 mounted on the carriage 21 is main-scanned over the print medium held at the print start position to print an image according to predetermined image information. Then, after the print medium is fed a predetermined distance by the rotation of the feed roller 9, the print head 19 is again main-scanned. This process of main scan and print medium feeding is repeated to execute the printing of an image on the print medium.

As in the normal mode, depending on whether the print medium is fed a predetermined distance or a discharge operation is performed to discharge the print medium whose entire surface has been printed, the drive data to be selected for driving the feed motor 18 changes. In this embodiment, the feed motor 18 is constructed of a stepping motor. When the feed motor 18 is driven in the "HS" mode, it is set that 192 steps driving of the stepping motor results in the print medium being fed a predetermined distance (10.837 mm). Hence, from FIG. 9, the feed motor 18 is driven under the drive condition corresponding to the drive data "L3" to execute the feeding of the print medium by the predetermined distance. Then, each time the print medium is fed the predetermined distance, the print head 19 prints on the print medium. When this sequence of feeding and printing is finished, the print medium is discharged. In this way, the feed motor 18 is driven under the drive condition corresponding to the drive data "L3" until a series of printing operations is completed.

The above description concerns a case where the "silent" drive mode and the "HS" print mode are selected. In the case of the silent mode, the drive value index used does not change among different print modes. Hence, when the silent mode is chosen, even if a print mode other than "HS" is selected, the same drive value index is used for all print modes. For example, when the feed motor drive amount required to feed the print medium the predetermined distance is 192 steps or more, a drive value index L3 is chosen, as in the above case, whatever the print mode. When the feed motor drive amount required to feed the print medium the predetermined distance is in the range of 1–191 steps, an appropriate drive value index is chosen from among the drive data L0, L1, L2 as shown in FIG. 9 according to the drive amount of the feed motor 18 whatever print mode is selected. For other than the predetermined distance feeding, the same drive value indices as those described above are used.

In the table of FIG. 9, when the silent mode is specified as the drive mode, a single drive value index for each motor is commonly used for all print modes. Further, the feed speed and the supply speed during the silent mode are equal to or smaller than those when a normal drive mode and a high quality print mode are selected. In a control that deserves a particular attention, these speeds are reduced significantly in those drive ranges where the feed motor is driven by large amounts (in FIG. 9, 48 steps or more).

Further, a comparison made between the silent mode drive data and the normal mode drive data in case where the same operations (ex. the paper supply operation etc.) are performed has found that the supply motor and the feed motor 18 are driven during the silent mode at speeds equal to or slower than those during the normal mode. Thus, the silent mode can achieve a quieter operation than the normal mode.

It is also possible to prepare dedicated drive data for the silent mode. In this embodiment, however, since a drive value index that will realize a quiet operation is chosen from among the drive data used in a series of operations performed during the normal mode, there is no need to newly generate dedicated drive value indices for the silent mode.

As described above, this embodiment can realize a printer and a printing system which can be used without the user worrying about operation noise whichever print mode is selected. Further, since no special drive data is added in executing the silent mode, the printing operation in the silent mode can be performed easily and quickly.

(5) Object to Be Drive-Controlled According to Mode

In the first example described above, what is drive-controlled in the silent mode in a way which is different from that of the normal mode is the feed motor and the supply motor. However, for a recovery system motor and a carriage motor, it is also possible to select drive data that ensures their quiet operations from the same drive table that is used in the normal mode and use the selected drive data in the silent mode. This can produce the similar effect to that described above.

In the above example, we have described the feed motor and supply motor to be constructed of stepping motors. DC motors may also be used, in which case the feed motor drive ranges based on the number of motor steps in FIG. 9 may be replaced with feed distances. This arrangement can also produce the similar effect using the DC motors.

The drive sources that are drive-controlled in the silent mode in a different manner than in the normal mode can be limited to a required minimum and still the similar effect to that described above can be produced. That is, the drive sources subject to the drive control can constitute a part or all of a plurality of drive sources used in the printing apparatus, regardless of their arrangements.

(6) Others

In the above embodiment, during the silent mode, drive data that ensures quiet operations is chosen from the same drive table that is used in the normal mode. It is also possible to prepare a new drive table dedicated for use in the silent mode and still achieve the object of the this invention.

Further, in the above embodiment the drive data selected in the silent mode does not differ among different print modes. It is, however, possible to prepare two or more kinds of silent mode with different levels of quietness, for example, one for the HS print mode and one for other print modes and provide different drive control conditions for different silent modes. This arrangement can also produce the similar effect to that described above.

It is noted that the method of classifying the drive ranges for the feed motor, the values set in the drive table, the kinds of drive data for one drive source and the drive data selected for the silent mode are not limited to those described above and that they can appropriately be set according to the arrangement of the printing apparatus or printing system.

The table used in performing the drive control according to a selected mode may be provided on the host computer 1000 side or on the printer 2000 side. In the former case, the drive data corresponding to the mode selected by the user is read out from memory and added to print data when the print data is transmitted to the printer 2000, which then performs a printing operation based on the drive data. In the latter case, a required data table is stored in the ROM 2007 so that, when the printer 2000 receives the mode data from the computer 1000, the printer 2000 can reference the table and make an appropriate setting.

Although in the above embodiment the mode setting is done by the printer driver on the host computer side, it may be processed on the printer side. For example, the printer may be provided with an input means for mode selection and the user may set a desired mode using this input means. This arrangement allows even a system without a graphical user interface (GUI) function on the host side to realize an equivalent function with ease. Further, a program for executing this processing need not be incorporated in the printer in advance but may be provided, as required, from the printer driver on the host side.

In addition, the scope of this invention also includes a printing system in which program codes of software or printer driver that realize the function of the above embodiment are loaded into a computer in a machine or the system connected with a variety of devices including the printing apparatus and in which a desired device is operated by the program codes stored in the computer in the machine or the system to realize the function of the above embodiment.

In this case, the program codes themselves realize a novel function of this invention and therefore the program codes themselves and means for loading the program codes into the computer via communication or memory media are also included in the scope of this invention.

Among possible memory media used for storing the program codes are floppy (trade name) disks, CD-ROMs, hard disks, optical disks, magnetooptical disks, CD-Rs, DVDs, magnetic tapes, nonvolatile memory cards and ROMs.

In addition to an arrangement that realizes the function of the above embodiment by the computer executing the program codes read out, the scope of this invention also includes another arrangement in which an operating system running on the computer executes a part or all of the actual processing according to instructions of the program codes to realize the function of the above embodiment.

Also included in the scope of this invention is an arrangement in which, after the program codes read out from a storage medium are written into a memory of a function expansion board inserted in the computer or into a memory of a function expansion unit connected to the computer, a CPU in the function expansion board or function expansion unit executes a part or all of the actual processing according to instructions of the program codes and thereby realize the function of the above embodiment.

Furthermore, the printing system of this invention, whether it is intended for personal use or business or industrial use, may be realized in the form of, for example, a device integrally combining an image data supply device, such as a computer, a scanner and a digital camera, with a printing apparatus as an image output terminal; a copying machine integrally combining a scanner and a printing apparatus; a facsimile incorporating a data transmission/reception device and a printing apparatus; a word processor and an electronic typewriter both incorporating a printing apparatus; and a digital camera with a built-in printing apparatus.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A printing apparatus using a print head for ejecting a print liquid onto a print medium to form an image on the print medium, the printing apparatus comprising:

drive control means to drive one or more of a plurality of drive sources in a first drive mode or a second drive mode selectively, wherein the plurality of drive sources are adapted to cause a plurality of driven portions in the printing apparatus to perform predetermined operations and the second drive mode makes a driving of the drive sources quieter than in the first drive mode; and mode switching means to switch between the first drive mode and the second drive mode, wherein the plurality of driven portions include supply means for introducing the print medium into the printing apparatus and conveying means for conveying the print medium introduced by the supply means to the print head in a conveying direction, the supply means and the conveying means being each provided with one of the drive sources, and the drive control means differentiates respective drivings of the drive sources for the supply means and the conveying means, between the first drive mode and the second drive mode.

2. A printing apparatus according to claim 1, wherein the plurality of the driven portions include performance maintaining means for maintaining a performance of the print head in applying the print liquid and the performance maintaining means is provided with one of the drive sources.

3. A printing apparatus according to claim 1, wherein when performing the driving in the first drive mode, the drive control means uses a plurality of drive control data associated with a series of drive controls.

4. A printing apparatus according to claim 3, wherein when performing the driving in the second drive mode, the drive control means selects drive control data that achieves a quiet driving from the plurality of drive control data used in the first drive mode and sets the selected drive control data.

5. A printing apparatus according to claim 4, wherein the drive control means performs the selection and setting so that drive speeds of the drive sources at each stage of a series of drive controls in the second drive mode are equal to or less than drive speeds of the drive sources at each stage of a series of drive controls in the first drive mode.

6. A method of controlling a printing apparatus, wherein the printing apparatus uses a print head for ejecting a print liquid onto a print medium to form an image on the print medium, the method comprising:

a drive control step of driving one or more of a plurality of drive sources in a first drive mode or a second drive mode, wherein the plurality of drive sources are adapted to cause a plurality of driven portions in the printing apparatus to perform predetermined operations and the second drive mode makes a driving of the drive sources quieter than in the first drive mode; and a mode switching step of switching between the first drive mode and the second drive mode, wherein the plurality of driven portions include supply means for introducing the print medium into the printing apparatus and conveying means for conveying the print medium introduced by the supply means to the print head in a conveying direction, the supply means and the conveying means being each provided with one of the drive sources, and the drive control step differentiates respective drivings of the drive sources for the supply means and the conveying means, between the first drive mode and the second drive mode.

7. A method of controlling a printing apparatus according to claim 6, wherein the plurality of the driven portions include performance maintaining means for maintaining a performance of the print head in applying the print liquid and the performance maintaining means is provided with one of the drive sources.

8. A method of controlling a printing apparatus according to claim 6, wherein when performing the driving in the first drive mode, the drive control step uses a plurality of drive control data associated with a series of drive controls.

9. A method of controlling a printing apparatus according to claim 8, wherein when performing the driving in the second drive mode, the drive control step selects drive control data that achieves a quiet driving from the plurality of drive control data used in the first drive mode and sets the selected drive control data.

10. A method of controlling a printing apparatus according to claim 9, wherein the drive control step performs the selection and setting so that drive speeds of the drive sources at each stage of a series of drive controls in the second drive mode are equal to or less than drive speeds of the drive sources at each stage of a series of drive controls in the first drive mode.

11. A printing system comprising:

a printing apparatus using a print head for ejecting a print liquid onto a print medium to form an image on the print medium; and an image supply device for supplying image data to said printing apparatus so that said printing apparatus can perform printing according to the image data supplied;

wherein said printing apparatus includes:

drive control means to drive one or more of a plurality of drive sources in a first drive mode or a second drive mode, wherein the plurality of drive sources are adapted to cause a plurality of driven portions in said printing apparatus to perform predetermined operations and the second drive mode makes a driving of the drive sources quieter than in the first drive mode; and mode switching means to switch between the first drive mode and the second drive mode, wherein the plurality of driven portions include supply means for introducing the print medium into the printing apparatus and conveying means for conveying the print medium introduced by the supply means to the print head in a conveying direction, the supply means and the conveying means being each provided with one of the drive sources, and the drive control means differentiates respective drivings of the drive sources for the supply means and the conveying means, between the first drive mode and the second drive mode.

12. A control program for instructing a computer to execute a printing apparatus control method, wherein the printing apparatus uses a print head for ejecting a print liquid onto a print medium to form an image on the print medium, the method comprising:

a drive control step of driving one or more of a plurality of drive sources in a first drive mode or a second drive mode, wherein the plurality of drive sources are adapted to cause a plurality of driven portions in the printing apparatus to perform predetermined operations and the second drive mode makes a driving of the drive sources quieter than in the first drive mode; and a mode switching step of switching between the first drive mode and the second drive mode, wherein the plurality of driven portions include supply means for introducing the print medium into the printing apparatus and conveying means for conveying the print medium introduced by the supply means to the print head in a conveying direction, the supply means and the conveying means being each provided with one of the drive sources, and the drive control step differentiates respective drivings of the drive sources for the supply means and the conveying means, between the first drive mode and the second drive mode.

13. A printing apparatus as claimed in claim 1, wherein the plurality of driven portions further include scanning means for scanning the print head relative to the print medium, and the scanning means is provided with one of the driving sources.

14. A method of controlling a printing apparatus according to claim 6, wherein the plurality of driven portions further include scanning means for scanning the print head relative to the print medium, and the scanning means is provided with one of the driving sources.

* * * * *